Nov. 19, 1968  M. P. SIEDBAND  3,412,311
BATTERY-OPERATED POWER SUPPLY CIRCUITRY FOR PROVIDING LONG
BATTERY LIFETIME AND CLOSE REGULATION
OF THE OUTPUT VOLTAGES
Filed March 28, 1966

WITNESSES
Theodore F. Wrobel
James F. Young

INVENTOR
Melvin P. Siedband
BY
ATTORNEY

United States Patent Office 3,412,311
Patented Nov. 19, 1968

3,412,311
BATTERY-OPERATED POWER SUPPLY CIRCUITRY FOR PROVIDING LONG BATTERY LIFETIME AND CLOSE REGULATION OF THE OUTPUT VOLTAGES
Melvin P. Siedband, Baltimore, Md., assignor to Westinghouse Electric Corporation, Pittsburgh, Pa., a corporation of Pennsylvania
Filed Mar. 28, 1966, Ser. No. 537,984
9 Claims. (Cl. 321—2)

ABSTRACT OF THE DISCLOSURE

The present disclosure relates to a power supply circuit which is battery operated and ideally adaptable to supply the various output potentials required by an oscilloscope tube for example. An inverter is utilized in the power supply for converting the D.C. output of the battery into an alternating current output which is transformed to various predetermined potential levels. A voltage multiplier circuit is utilized for providing in response to a predetermined potential an output voltage substantially equal to the multiplier of the voltage multiplier. The multiplier circuit includes first and second submultiplier circuits with each of these circuits developing a portion of the total output voltage of the voltage multiplier. A bleeder circuit is provided for one of the submultiplier circuits and is adapted to pass sufficient bleeder current therethrough to prevent the portion of the total output voltage appearing thereacross from dropping below a prescribed level. This predetermined portion of the total output voltage is ideally utilized to supply the high current consuming portions of an oscilloscope tube, for example.

---

Figure 1:
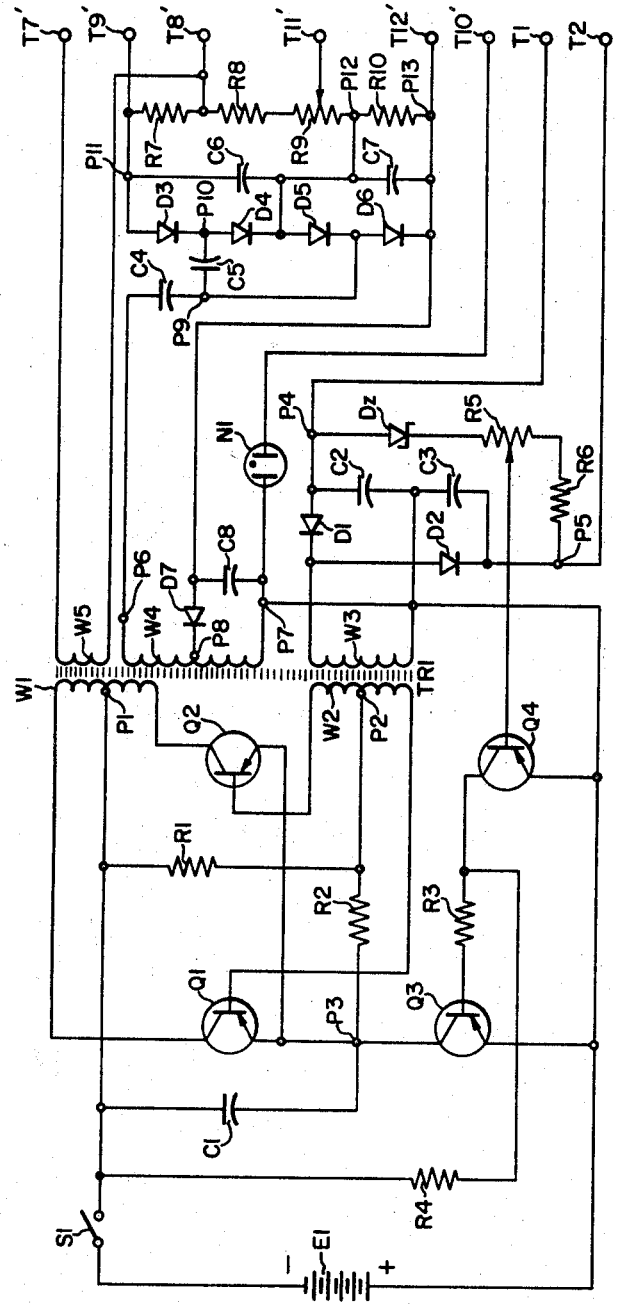

The present invention relates to power supply circuitry and, more particularly, to battery-powered power supply circuitry providing particularized outputs.

A serious problem always associated with battery-powered equipment is that of limited battery lifetime. This problem is especially troublesome when designing emergency equipment which is to be portable. Examples of such portable battery-powered equipment are heart resuscitators, respirators, and diagnostic instruments for determining if a heart attack, stroke, etc., have occurred.

Because of the type of specialized circuitry utilized in the various types of portable equipment, it may be necessary that the power supply for the equipment be capable of providing particular output voltages. In copending application Ser. No. 483,669, filed Aug. 30, 1965, by the present inventor and assigned to the same assignee, a portable cardiac waveform oscilloscope is shown which is portable and may be battery-powered so as to serve as a portable diagnostic tool to recognize if a patient has had a heart attack. A miniature cathode-ray tube is utilized in the oscilloscope of the above application to display the cardiac waveform of a patient under observation. The use of a cathode-ray tube requires the power supply to supply closely regulated output voltages, since variations in excess of 5% may adversely affect the lifetime of the cathode-ray tube. Moreover, it is necessary that the voltage applied to the focus electrode of the cathode-ray tube be held within close tolerance to maintain focus while the cathode-ray tube is being scanned. Current drain on the battery of such equipment as the cardiac oscilloscope may cause the battery voltage to drop in excess of the limits required for safe operation of the cathode-ray tube. It thus becomes imperative in such types of battery-powered portable equipment that the power supply thereof be regulated within close limits even though voltage drops in the batteries occur. It is also necessary to design the power supply in such a manner to limit current drain on the battery so that the operability of the circuit and the lifetime of the battery are improved.

It is therefore an object of the present invention to provide new and improved battery-operated power supply circuitry which achieves long lifetime of the battery operation.

It is a further object to provide a new and improved battery-operated power supply circuitry which provides closely regulated output voltages.

It is a further object to provide a new and improved battery-powered power supply circuit which minimizes current drain on the battery through the circuit design thereof and thereby provides long battery lifetime and also affords close regulaiton of the output voltages of the power supply independent of variations of the battery voltage.

Broadly, the above cited objects are accomplished by providing battery operated power supply circuitry wherein: the direct current output of the battery source is converted to alternating outputs to be transformed to predetermined output potentials, with the output potentials being regulated by a feedback control to compensate for any deviations from the predetermined value. A voltage multiplier circuit is provided which is responsive to one of the predetermined potentials and supplies a multiplied output therefrom. The voltage multiplier circuit includes submultiplier circuits which provide a substantially constant portion of the total output voltage of the voltage multiplier circuit thereacross. A bleeder circuit is connected across one of the submultiplier circuits to pass sufficient current therethrough to prevent the voltage output thereof to drop below a prescribed value.

Figure 2:
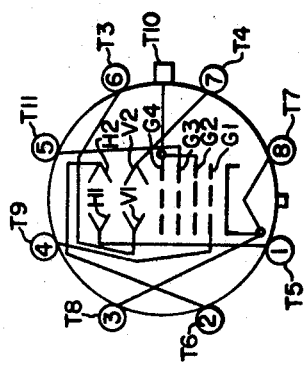

These and other objects and advantages will become more apparent when considered in view of the following specification and drawings, in which:

FIGURE 1 is a schematic diagram of the power supply circuitry of the present invention; and FIG. 2 is a schematic diagram of a cathode-ray tube which may be supplied by the power supply circuitry of FIG. 1.

Referring to FIG. 1, a power supply circuit is shown utilizing a battery E1 as the source of operating energy. The battery may comprise conventional dry cells (Leclanche), mercury cells, manganese cells, or nickel-cadmium cells. The battery E1 may conveniently supply a 6 volt output, the polarities being indicated with the positive electrode being connected to ground and the negative electrode connected to one end of a switch S1. The closing of the switch S1 energizes the power supply circuit.

In order to convert the direct current of the battery E1 into alternating current, an inverter circuit is provided including transistors Q1 and Q2. The emitter electrodes of the transistors Q1 and Q2 are commonly connected, while the collector electrodes are connected by a winding W1 and the base electrodes are connected by a winding W2. The windings W1 and W2 form the primary windings of a transformer TR1. The transformer TR1 is designed to be of the saturable type having a square loop core. Each of the windings W1 and W2 have a center tap P1 and P2 respectively. A load resistor R1 is connected between the center tap points P1 and P2. A resistor R2 is connected between the center tap point P2 and a circuit point P3 at the emitter electrodes of the transistors Q1 and Q2. A capacitor C1 is connected between the circuit point P3 and the center tap point P1 of the winding W1.

The operation of the inverter circuit is such that when one of the transistors is conducting, the other is non-conducting. Assume initially that the transistor Q1 is non-conducting and the transistor Q2 is conducting. The current will thus flow in the collector-emitter circuit of the transistor Q2 through the winding W1 to the center tap P1 thereof, and then through the resistors R1 and R2 to the emitter point P3. When the core of the transformer TR1 saturates, a voltage will be induced in the winding W2 in the base circuits of the transistors Q1 and Q2, with a voltage of a negative polarity being applied to the base, with respect to emitter, of the transistor Q1 to render this transistor conductive, while a positive polarity voltage at the other end of the winding W2 is applied to the base, with respect to emitter, of the transistor Q2 to render it nonconductive. With the transistor Q1 now conductive, current will flow in the collector-emitter circuit of the transistor Q1 to energize the other half of the winding W1 to the center tap P1. Current will flow in the opposite direction to that supplied previously by the transistor Q2 which will saturate the core of the transformer TR1 in the opposite direction. Therefore, upon saturation of the transformer TR1, a voltage will be induced in the winding W2 of the opposite polarity to that previously induced. A negative polarity voltage will thus be supplied to the base, with respect to emitter, of the transistor Q2 to render this transistor conductive, while a positive polarity voltage taken from the other end of the winding W2 will be applied to the base, with respect to emitter, of the transistor Q1 to render it nonconductive.

With the transistor Q2 conductive, a current path is provided in the collector-emitter circuit thereof, through the winding W1 to the center tap P1, through the resistors R1 and R2 to the circuit point P3 at the emitter electrodes of the transistors Q1 and Q2. With the transistor Q1 conductive, a current path is provided in the collector-emitter circuit thereof through the winding W1 to the junction point P1, utilizing the other half of the winding W1 from that used with the transistor Q2 conductive, with current flow being in the opposite direction. The circuit path is completed through the resistors R1 and R2 to the junction point P3 at the emitter electrodes of the transistors Q1 and Q2.

The frequency of operation of the inverter circuit can, of course, be controlled by the proper selection of the component values within the circuit to effect the conductive and nonconductive periods of the transistors Q1 and Q2. The principal frequency determining element is the inverter transformer since the saturation time of the core is related to the turns-volt-second integral of the transistor collector winding P1. The magnitude of the alternating voltage output of the inverter circuit is determined by the magnitude of the voltage appearing at the circuit point P3. The magnitude of the voltage appearing at the circuit point P3 is closely regulated so as to insure that the output of the power supply circuit is held within fixed limits.

In order to control the voltage at the circuit point P3, a regulator circuit including a transistor Q3 and a transistor Q4, in combination with a voltage reference circuit for the transistor Q4 is utilized. The transistor Q3 has its collector electrode connected to the circuit point P3 and its emitter electrode connected at the positive electrode of the battery E1. The degree of conductivity of the transistor Q3 therefore, determines the magnitude of the voltage appearing at the circuit point P3. With the transistor Q3 fully conductive, the circuit point P3, at the collector of the transistor, will be at substantially the positive battery voltage of the battery E1. At lesser degrees of conductivity, the voltage at the point P3 will be somewhat less positive than the battery voltage. The collector of the transistor Q4 is connected through a resistor R3 to the base of the transistor Q3 to control the conductive level of the transistor Q3. The emitter of the transistor Q4 is grounded and a resistor R4 is connected between the negative electrode of the battery E1, with the switch S1 closed, and the collector of the transistor Q4. The base of the transistor Q4 is connected to the tap of a voltage adjust potentiometer R5. The voltage adjust potentiometer R5 forms part of a voltage divider circuit including a Zener diode Dz, which has its cathode connected to one end of the potentiometer R5 and its anode electrode connected to a circuit point P4. The voltage divider also includes a resistor R6 connected between a circuit point P5 and the other end of the potentiometer R5.

The voltage applied across the voltage divider circuit between the circuit points P4 and P5 is provided by a circuit including a secondary winding W3 on the transformer TR1. A diode D1 is connected from anode to cathode between the circuit point P4 from one end of the winding W3 and a diode D2 is connected from cathode to anode between the circuit point P5 and the same end of the winding W3. A capacitor C2 is connected between the circuit point P4 and the other end of the winding W3, which is grounded, and a capacitor C3 is connected between the circuit point P5 and the grounded end of the winding W3.

The winding W3 is selected to provide a relatively low output voltage which will be assumed herein to be such that a direct current output of +8 volts will be provided at the circuit point P5 and −8 volts will be provided at the circuit point P4. The alternating voltage appearing at the winding W3 is converted to direct current in the diodes D1 and D2 with the capacitors C2 and C3 acting as conventional power supply capacitors. The Zener diode Dz is so selected to be in its constant voltage current state so that a constant voltage drop appears thereacross independent of the magnitude of the current flowing therethrough from cathode to anode. Thus, the voltage drop across the diode Dz is independent of the voltage appearing between the circuit points P4 and P5.

The tap on the voltage adjust potentiometer R5, which is connected to the base of the transistor Q4, is so adjusted initially that the output voltage appearing between the circuit points P4 and P5 is 16 volts such that +8 volts appears at point P5 and −8 volts at point P4. The initial adjustment of the tap for potentiometer R5 will provide a negative polarity potential to the base of the transistor Q4 which will control the conductivity thereof. The collector of the transistor Q4 being connected to the base of the transistor Q3 will in turn control the conductivity of the transistor Q3. The collector of the transistor Q3 is connected at the circuit point P3 which determines the voltage amplitude applied to the inverter circuit and therefore the output of the inverter circuit applied to the transformer TR1. The magnitude of the output of the inverter circuit determines the magnitude of voltage induced in the secondary winding W3. The magnitude of voltage appearing at the winding W3 is thereby determined by the setting on the voltage adjust potentiometer R5.

Once the voltage adjust potentiometer R5 has been set to provide the desired ±8 volt output at the circuit points P5, P4, respectively, any variation of the voltage across the circuit points will be reflected in the magnitude of the potential applied to the base of the transistor Q4. Thus, for example, if the voltage across the circuit points P5 and P4 should increase to a value greater than ±8 volts (±8.5 volts for example), the magnitude of voltage appearing at the tap on the voltage adjust potentiometer R5 would be a larger negative potential than would be the case when the desired ±8 volts would be developed across the circuit points. This is due to the fact that the Zener diode Dz has a constant voltage drop thereacross independent of the current through the voltage divider circuit. With an increased negative bias voltage being applied to the base of the transistor Q4, the transistor Q4 will be rendered more conductive, therefore driving the collector thereof in the positive direction.

Since the collector of the transistor Q4 is coupled to the base of the transistor Q3, a more positive voltage will be applied to the base electrode of the transistor Q3 which will render it less conductive causing the collector thereof to be driven in a less positive direction. Therefore, the voltage appearing at the circuit point P3 which is the input voltage to the inverter circuit will be of a lower magnitude which will in turn lower the output voltage from the inverter circuit which is coupled through the winding W1 to the secondary winding W3 of the transformer TR1. The voltage induced in the winding W3 will thereby be reduced with the unidirectional output appearing at the circuit points P5 and P4 being correspondingly reduced toward the ±8 volt level which is desired.

The feedback voltage taken from the tap on the voltage adjust potentiometer R5 will thus revert to its desired value for ±8 volt operation, with the voltage applied to the base of the transistor Q4 being the correct value to sustain ±8 volts. The transistor Q3 in response to the conductivity of transistor Q3 will in turn supply the proper voltage at the circuit point P3, which will permit the desired ±8 volt output from the voltage divider across the terminals P5–P4.

The regulating arrangement is also operative to increase the output across the voltage divider between the circuit points P5 and P4 if the voltage thereacross should drop below the desired ±8 volt level. Thus, if the voltage should drop below the ±8 volt level, the voltage appearing at the tap of the voltage adjust potentiometer R5 would be driven in the positive direction as compared to value developed at the tap for ±8 volt operation. The more positive voltage applied to the base of the transistor Q4 will cause it to be less conductive than its normal state, which will thus drive the voltage at its collector in the less positive direction. Thus a more negative potential will appear at the base of the transistor Q3 which will cause it to be more conductive thereby driving the collector thereof in the positive direction to increase the positive voltage applied to the circuit point P3 of the inverter circuit. The increased voltage at the circuit point P3 will in turn cause the output voltage from the inverter circuit, which is transferred through the winding W1 to the winding W3 of the transformer TR1, to increase back toward the desired ±8 volt level. The increased output of the winding W3 will thereby increase the direct voltage appearing across the circuit point P5 and P4 to the desired ±8 volt level, with the voltage appearing at the tap of the potentiometer R5 reverting to its previously established value which in turn establishes the conductive level of the transistor Q4, which accordingly controls the conductivity of the transistor Q3.

It can thus be seen that the voltage developed across the voltage divider at the circuit points P5 and P4 is regulated by the feedback action of the variations in the voltage appearing at the tap of the potentiometer R5 which is fed back through the transistors Q4 and Q3 to control the input voltage supplied to the inverter circuit at the point P3. The regulated voltage appearing across the circuit points P4 and P5 may be utilized as operating voltage for transistor circuitry, for example, which would form part of the apparatus being supplied by the power supply circuit shown in FIG. 1. A terminal T1 is provided and is connected to the circuit point P4 from which the —8 volt operating voltage may be taken, and a terminal T2 is provided and connected to the circuit point P5 from the which the +8 volt operating voltage may be taken.

As previously mentioned, the power supply circuitry of the present invention is particularly adapted to be utilized with a cathode-ray oscilloscope tube and as such provides the necessary output voltages required for such a tube as well as providing exceptional battery lifetime due to the uniqueness of the circuitry utilized therein. FIG. 2 shows schematically an oscilloscope tube, which may, for example, be of the miniature type having a one inch screen which is presently available. The tube includes a pair of orthogonally disposed electrostatic deflection plates of the type well known in the art. As shown in FIG. 2, a pair of vertical deflection plates V1 and V2 and a pair of horizontal deflection plates H1 and H2 are utilized. To the vertical deflection plates via a pair of terminals T3 and T4, respectively, electrical signals indicative of a physical quantity such as a patient's cardia waveform may be applied. To the horizontal deflection plates H1 and H2, through a pair of terminals T5 and T6, respectively, a saw-tooth waveform indicative of a time base may be applied. Circuitry capable of developing such waveforms is described in the above-cited copending application Serial No. 483,669.

The tube also includes a heater-cathode circuit K through which heater current is applied via a pair of terminals T7 and T8. The tube also includes a first grid electrode G1, a second grid electrode G2, a third grid electrode G3 and a fourth grid electrode G4. A terminal T9 is connected to the first grid electrode G1 to which a direct voltage having magnitude of approximately —1000 volts is applied for the proper operation of the tube. The second grid electrode G2 and the fourth grid electrode G4 are commonly connected to a terminal 10. To the terminal T10 is applied a potential of approximately 60 volts required for the proper operation of the tube. The third grid electrode G3 has connected thereto a terminal T11 to which is applied a focussing potential which will be somewhat less than one-half the value of the potential applied to the first grid electrode G1.

It is well known in cathode-ray tubes used in the design of oscilloscopes that the cathode-heater circuit, first grid electrode and second grid electrode consume by far the greatest current. The remaining electrodes draw a small percentage of the total current of approximately 2 to 5 percent thereof. In power supply design, in order to provide a closely regulated output voltage, it is necessary that more current be drawn by the power supply in a bleeder resistive network than by the load. If this does not occur, the current consumed by the load will adversely affect the voltage output in the power supply itself causing excessive drops therein and excursions of the output voltage. Thus, if a large current consuming load is to be used with the power supply, it becomes necessary that the power supply have low enough resistance bleeder network to accommodate this which means the drawing of appreciable current by the power supply. If a battery-operated power supply is to be used, this of course results in a large current drain on the battery and low lifetime of operation for the battery.

In the power supply circuitry of FIG. 1, the necessity of drawing large bleeder currents and thus short battery lifetime is avoided through the use of a voltage quadrupler arrangement and the associated bleeder network therein.

The high voltage portion of the power supply circuit of FIG. 1 is developed in a secondary winding W4 which has a top end indicated by a circuit point P6, a bottom point indicated by a circuit point P7, which is directly connected to the positive electrode of the battery E1, and a tap point P8. A capacitor C4 is connected between the circuit point P6 and a circuit point P9. A capacitor C5 is connected between the circuit point P9 and a circuit point P10, which is at a junction point of the cathode of a diode D3 and the anode of a diode D4. A capacitor C6 is connected between the anode of the diode D3 and the cathode of the diode D4. A resistive bleeder network is connected between a circuit point P11 at the anode of the diode D3 and a circuit point P12 at the cathode of the diode D4. The bleeder network includes a series combination of a resistor R7, a resistor R8 and a focussing potentiometer R9. These resistors are connected in series with the bottom end of the potentiometer connected to the circuit point P12 and the top end of the resistor R7 connected to the circuit point P11.

The capacitor C5, the diodes D3 and D4 and the capacitor C6 form a well known voltage doubler circuit with the magnitude of the output voltage being substantially twice the magnitude of the input voltage applied thereto. The just described circuitry thus comprises one-half of the voltage quadrupler circuit to be used herein. The lower portion of the voltage quadrupler circuit forms a voltage doubler circuit including the capacitor C4, a pair of diodes D5, D6, and a capacitor C7. The capacitor C4 has one end connected to the circuit point P9 which is at the junction point between the cathode of the diode D5 and the anode of the diode D6. The capacitor C7 is connected between the anode of the diode D5 and the cathode of the diode D6. A resistor R10 is connected between the bottom end of the voltage bleeder circuit at the circuit point P12 and a circuit point P13. The circuit point P13 is returned through a diode D7 to the tap point P8 of the winding W4. The diode D7 has its cathode connected to the point P8 and its anode connected to the circuit point P13. A filtering capacitor C8 is connected between the anode of diode D7 and the circuit point P7 of the bottom of the winding W4. The diode D7 provides a unidirectional output therefrom being filtered by the capacitor C4. A terminal T12 is connected to the anode of the diode D7 and serves as one of the output terminals for the power supply circuitry and may conveniently supply, for example −110 volts, that may be utilized as an operating potential for transistor circuitry to be supplied by the power supply circuit. The use of the tap point P8 and the diode D7 thus provide a convenient source of direct voltage without the addition of separate windings or other components.

A neon bulb N1 is connected between the circuit point P7 of the bottom end of the winding W4 and a terminal T10′ at the output of the power supply circuitry. The neon bulb N1 is selected to have a breakover voltage rating of, for example, 60 volts which when in this condition, will maintain an output of 60 volts at the terminal T10′. This is the ground return of the electron beam current via T10 and stabilizes the C.R.O. tube at −60 volts which is a reasonable value for that electrode approximately equal to the average deflection plate voltage so as to minimize astigmatism.

Another secondary winding W5 is provided for transformer TR1 in order to supply heater current to the oscilloscope tube of FIG. 2. This winding includes a terminal T7′ connected to one end thereof and a terminal T8′ connected to the other end thereof. The terminal T8′ is also connected to the junction between the resistors R7 and R8. Developed across the terminals R7 and R8 may be a voltage (approximately 3 volts peak-to-peak for example) which will be utilized and connected to the corresponding terminals T7 and T8 of the oscilloscope tube shown in FIG. 2 and will supply the necessary heater current thereto for the proper operation of the tube.

The operating potential supplied to the first grid G1 of the oscilloscope tube is taken from the circuit point P11 from a terminal T9′ connected thereto. The terminal T9′ is intended for connection to the corresponding terminal T9 of the tube shown in FIG. 2. The voltage developed at this point may, for example, be −1000 volts D.C. From the tap on the focussing potentiometer R9 is connected a terminal T11′ which develops a suitable potential suitable for applying to the third grid G3 through a terminal T11 thereof. The tap on the focussing potentiometer R9 may be adjusted to provide suitable focussing of the electron beam being scanned on the screen of the oscilloscope tube.

The power supply circuitry shown in FIG. 1 thus develops the necessary operating voltages for the cathode-ray tube of FIG. 2. The particular circuit arrangement moreover only requires less than one-fourth the energy as would be required in other types of circuits not using the voltage quadrupler and bleeder network as utilized herein. The outputs of the upper and lower voltage doubler portions of the voltage quadrupler are substantially constant. One-half the voltage of the voltage quadrupler is thus developed across the upper voltage divider across the resistors R7 and R8 and the potentiometer R9. The other half of the output of the voltage quadrupler is developed across the resistor R10 of the lower voltage doubler. The bleeder resistors R7, R8 and R9 are selected of such value to provide the desired output at terminals T9′, T8′ and T11′ associated therewith. Typical values of these resistors might be R7 10 kilohms, R8 420 kilohms, and R9 500 kilohms. The resistor R10 across the lower voltage doubler is selected to have as high a value as possible to permit proper operation of this portion of the circuit. For example, a typical value for operation with the selected values of R7, R8 and R9 would be 4.7 megohms. The resistor R10 is thus seen to be approximately 5 times the value of the combined resistive bleeder networks R7, R8 and R9. As previously mentioned by far the greatest current consuming portions of the oscilloscope tube are the cathode-heater, first grid and third grid (or screen grid as it is sometimes called). It should be noted that the outputs applied to these electrodes correspond to terminal T9′ for the first grid G1 and T11′ for the third grid G3. The cathode is supplied by the terminals T7′ and T8′.

By the arrangement of the relatively low resistance bleeder network R7, R8 and R9, the output current for the electrodes of the oscilloscope tube supplied by the upper portion of the voltage quadrupler are bled at approximately ½ the voltage output from the voltage quadrupler. Because the bleeder operates at ½ the usual voltage and because the resistance at any tap of the bleeder must be at a certain minimum value, the taps are near the ends of the bleeder where the resistance is low. Thus the bleeder may have a higher value of total resistance and operate at ½ or less than the usual voltage to permit a considerable reduction of bleeder power. Herein two voltage doubler circuits each providing substantially constant voltage outputs are utilized with the relatively low resistance bleeder network being connected across only the upper high voltage portion of the combined voltage quadrupler circuit. Thus the high output voltage necessary for supplying the first grid of the tube is provided and also the necessary focussing potential is provided through a potentiometer at the bottom end of the bleeder network. The relatively high consumption of current by the associated electrodes of the oscilloscope tube is provided without undue variations in the output voltage of the upper half of the voltage quadrupler since sufficient bleeding current is passed through the resistors R7, R8 and the potentiometer R9. Moreover, as previously stated, more than ½ of the power supplied by the input battery is saved since the bleeding takes place only across the upper portion of the voltage quadrupler wherein a high bleeder current must pass in order to avoid a drop in the output of this portion of the power supply. The use of the high impedance for the resistance R10 is permissible since only a very small portion of the total current drain of the power supply is taken therefrom.

Moreover, because the potential applied to the screen electrode G3 is taken from the upper voltage doubler and is thereby closer to the high voltage output of the voltage quadrupler, less bleeder current is required to be drawn by the bleeder network, and therefore the energy necessarily supplied by the battery is reduced. This results in a reduction in the enegry required of ¼ to ⅓ and would otherwise be the case with a conventional type of power supply circuit.

It can thus be seen that the power supply circuit of the present invention provides all of the necessary outputs for providing the operating potentials for an oscilloscope tube as well as providing low voltage and high voltage outputs which can be utilized with transistor circuitry. Furthermore, long battery lifetime is attained through the unique use of a voltage quadrupler circuit wherein the high power consuming portions of the oscilloscope tube are connected across the upper portion of the voltage quadrupler wherein effective current bleeding is provided so that proper regulation of the output thereof is maintained.

It should also be observed that the outputs across the windings W4 and W5 are controlled through the regulatory circuits including the transistors Q3 and Q4 and the voltage divider network including the Zener diode Dz, the potentiometer R5 and the resistor R6. Because any variation in the voltage appearing across the winding W3 will cause a corresponding correction in the output voltage of the inverter circuit including the transistors Q1 and Q2, this will regulate not only the output across the winding W3 but also the outputs of the windings W4 and W5 in the proper direction to bring about the desired operating potentials at these secondary windings.

Although the present invention has been described with a certain degree of particularity, it should be understood that the present disclosure has been made only by way of example and that numerous changes in the details of circuitry and the combination and arrangement of parts and components may be resorted to without departing from the scope and the spirit of the present invention.

I claim as my invention:

1. A power supply circuit operative with a battery source comprising:
   inverter circuit means for converting a direct current input from said battery source to an alternating current output;
   transforming means for receiving said alternating current output and including output means for developing predetermined potentials thereacross; and
   a voltage multiplier circuit responsive to a predetermined potential developed at said output means to provide an output voltage substantially equal to the multiplier of said voltage multiplier circuit times the input potential applied thereto, said multiplier circuit including
   first and second multiplier circuits, each for developing thereacross a predetermined portion of the total output voltage of said voltage multiplier circuit, and
   bleeder circuit means operatively connected across one of said submultiplier circuits for passing sufficient bleeder current therethrough to prevent the predetermined portion of the total output voltage appearing thereacross from dropping below a prescribed level.

2. The circuit of claim 1 including:
   regulating circuit means responsive to a potential developed at said output means for controlling the direct current input to said inverter means to compensate for any deviations from predetermined potentials at said output means;
   said voltage multiplier circuit comprises a voltage quadrupler circuit providing an output voltage substantially four times the input potential applied thereto, and
   said first and second submultiplier circuits comprising voltage doubler circuits with approximately one-half the total output voltage of said voltage quadrupler circuit being developed thereacross, the output voltage of each of said voltage doubler circuits being substantially constant.

3. The circuit of claim 2 wherein:
   said first and second voltage doubler circuits are so arranged that the higher voltage is developed at said first voltage doubler circuit,
   said bleeder circuit means including a resistance network operatively connected across said first voltage doubler circuit, with the resistance network being selected so that a relatively large current consuming load may be converted thereacross without substantially affecting the voltage ouptput of said first voltage doubler circuit.

4. The circuit of claim 3 wherein:
   high resistance means compared to said resistance network being connected across said second voltage doubler circuit so that relatively high current is drawn only through said resistance network.

5. The circuit of claim 3 wherein:
   said transforming means includes a primary winding for receiving the alternating current output of said inverter means and said output means thereof includes a plurality of secondary windings for respectively developing predetermined potentials thereacross,
   said regulating means including a voltage divider circuit operatively connected across a first of said secondary windings and including therein a constant voltage device so that variations in the potential developed thereacross from the predetermined potential may be detected and utilized to compensate for deviations in the predetermined potentials developed across said secondary windings.

6. The circuit of claim 5 wherein:
   said voltage quadrupler circuit is supplied by a second of said secondary windings, said secondary winding having a tap thereon with a unidirectional device operatively connected thereto so that a unidirectional voltage having a predetermined amplitude may be supplied thereby.

7. The power supply circuit of claim 1 further being adapted to supply operating potentials to an oscilloscope tube having a plurality of electrodes and wherein:
   means are provided for operatively connecting said bleeder circuit means to electrodes of said oscilloscope tube which are the high current consuming electrodes thereof.

8. The power supply circuit of claim 3 further being adapted to supply operating potentials to an oscilloscope tube having a plurality of electrodes and wherein:
   the relatively large current consuming load comprises selected electrodes of said tube which are the high current consuming electrodes thereof.

9. The power supply circuit of claim 5 being adapted to supply operating potentials to an oscilloscope tube including a heater-cathode circuit, a plurality of grid electrodes, and wherein:
   said voltage quadrupler circuit is supplied by a second of said secondary windings,
   a third of said secondary windings providing heating current to said heater-cathode circuit of said tube,
   means for connecting the high voltage end of said first voltage doubler circuit to a first of said grid electrodes,
   said resistance network including a tap thereof where a predetermined focus voltage may be taken,
   means for applying said focus voltage to a second of said grid electrodes,
   and a voltage responsive means operatively connected to said second winding to develop a predetermined grid voltage, and
   means for applying said grid voltage to a third of said grid electrodes of said tube.

References Cited

UNITED STATES PATENTS

| | | | |
|---|---|---|---|
| 3,012,181 | 12/1961 | Schultz | 321—18 XR |
| 3,192,464 | 6/1965 | Johnson et al. | 321—2 |
| 3,237,081 | 2/1966 | Martin | 321—18 |
| 3,243,683 | 3/1966 | Ackley | 321—15 XR |
| 3,305,756 | 2/1967 | Doss et al. | 321—18 XR |
| 3,305,760 | 2/1967 | Davis et al. | 321—18 XR |
| 3,337,787 | 8/1967 | Joseph | 321—15 XR |

FOREIGN PATENTS

| | | |
|---|---|---|
| 850,343 | 10/1960 | Great Britain. |

LEE T. HIX, *Primary Examiner.*

WM. M. SHOOP, JR., *Assistant Examiner.*